Oct. 15, 1940.     C. A. SWANSTROM     2,217,715
APPARATUS FOR MANUFACTURE OF SELF-LOCKING NUTS
Original Filed April 19, 1938     2 Sheets-Sheet 1
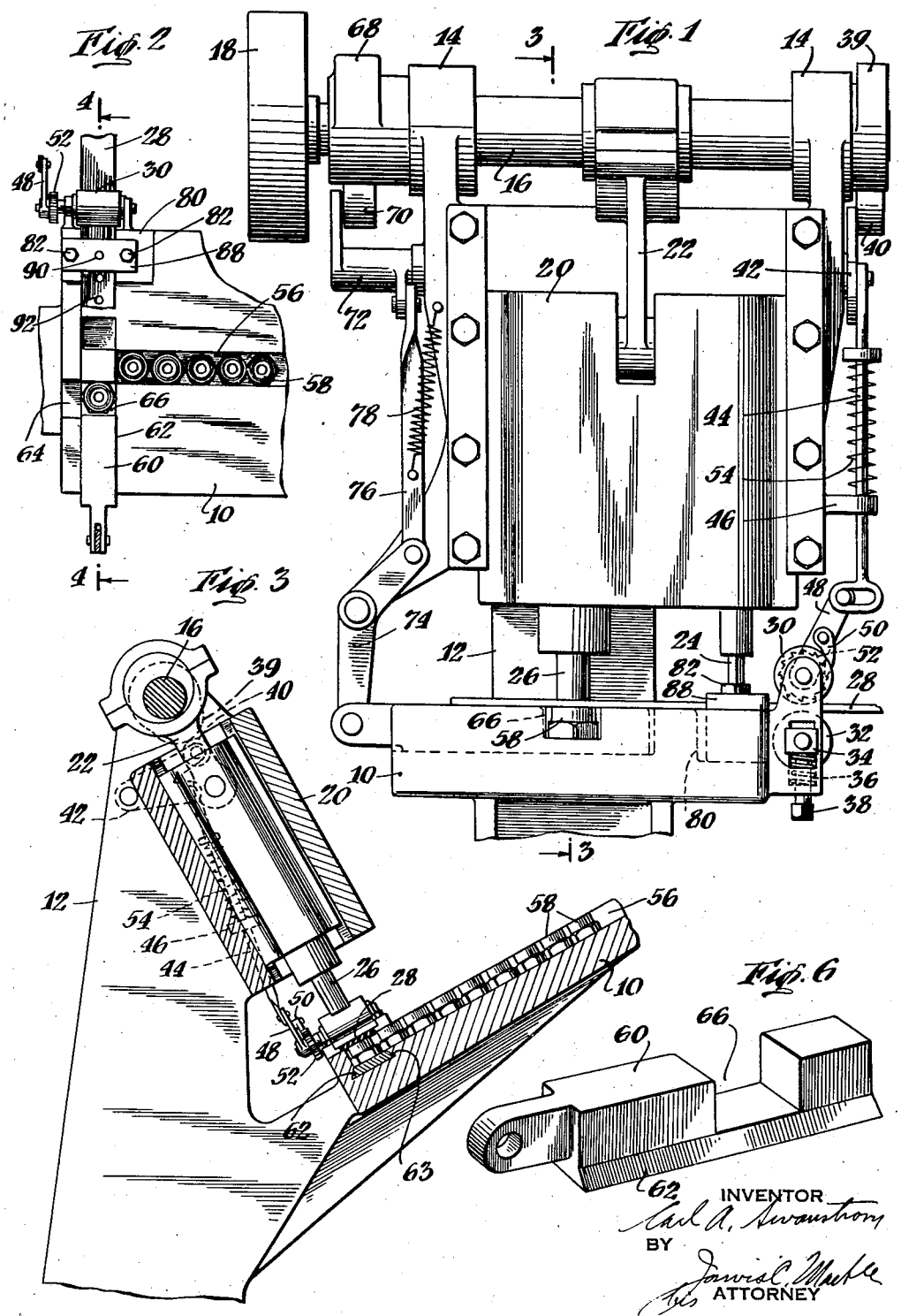

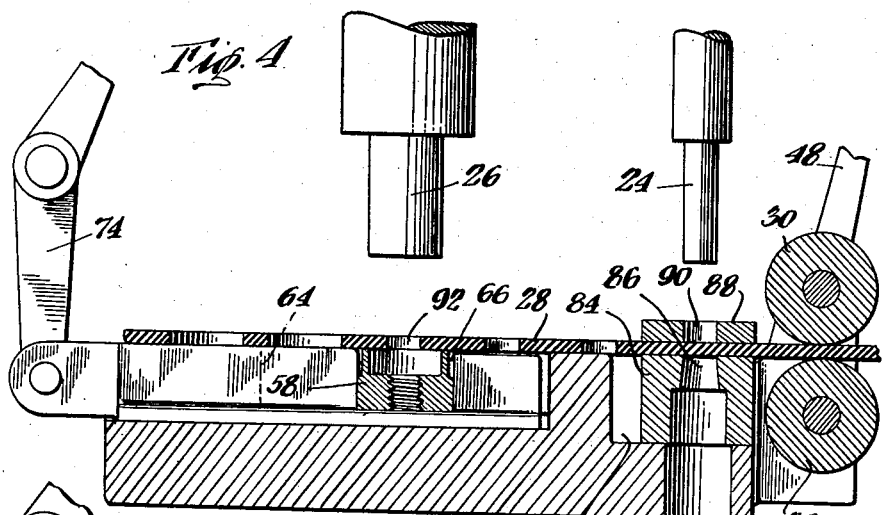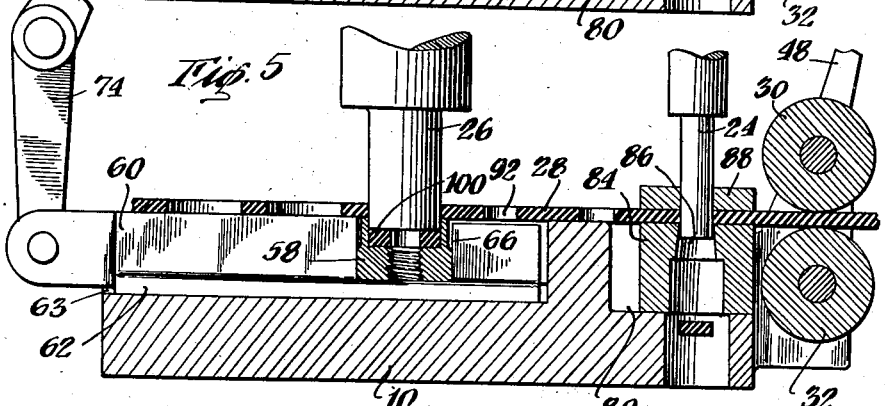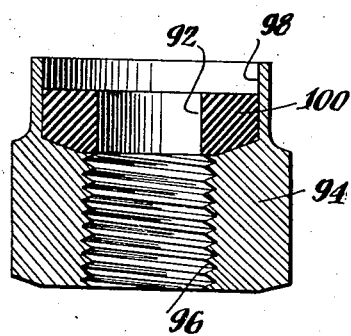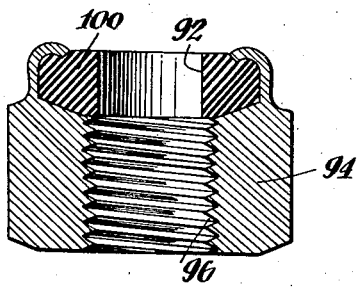

Patented Oct. 15, 1940

2,217,715

UNITED STATES PATENT OFFICE 2,217,715

APPARATUS FOR MANUFACTURE OF SELF-LOCKING NUTS

Carl A. Swanstrom, Maplewood, N. J., assignor to Elastic Stop Nut Corporation, Elizabeth, N. J., a corporation of New Jersey Original application April 19, 1938, Serial No. 202,824. Divided and this application January 3, 1940, Serial No. 312,232

6 Claims. (Cl. 10—72)

This application is a division of my copending application Serial No. 202,824, filed April 19, 1938.

The present invention relates to apparatus for making self-locking nuts and has particular reference to apparatus for making self-locking nuts of the kind in which the locking action is produced by an insert of elastic material fixed in the nut and in which a thread is impressed by the bolt or stud upon which the nut is threaded. This type of nut and its mode of operation to obtain self-locking effect are disclosed in U. S. Patent No. 1,550,282 granted to T. G. Rennerfelt.

In order for nuts of the character under consideration to be effective it is essential that the elastic insert, which is ordinarily in the form of an annular washer retained in a suitable recess in the nut body, be fixed therein against rotation relative to the nut body.

Heretofore nuts of the character under consideration have been manufactured by various different methods all of which, however, involve the general procedure of forming a suitably recessed and threaded nut body, separately forming annular washer-like inserts of the elastic material, loading the inserts into the recesses in the nut bodies, and thereafter deforming the walls of the recesses by a crimping or like operation to clamp the insert in the recess. For the production of commercially practical nuts it is evident that the cost of manufacture must be relatively low and consequently it is not only theoretically desirable but actually the commercial practice to form the insert receiving recesses in the nut bodies of circular cross section. Nut bodies having such recesses may be produced rapidly and cheaply on automatic screw machines. For use in such recesses circular washers of insert material are employed and it will of course be evident that the circular form of the insert provides the most difficult shape to effectively retain against rotation in the nut body. In order to insure such retention against rotation, various expedients have been resorted to in the production of nuts of this character, such for example as forming washer receiving recesses having irregularities in the circumference or bottom walls thereof or by producing irregular indentations in such walls concurrently with or subsequent to the crimping of the nut body to lock the insert in place.

These methods have not proved to be entirely satisfactory because, among other things, of the added cost. It has been demonstrated that satisfactory holding of the inserts against rotation in the nut bodies is possible of attainment without resorting to indentations or other means for producing irregularity of contour of the finished recess and insert, provided sufficient pressure, which is preferably applied both axially and radially to the insert, is exerted on the insert, but from a practical commercial standpoint the reliable locking of circular inserts in their recesses, without resort to special indentations or other keying means, is relatively difficult to accomplish in cheap mass production of nuts of this kind, largely because of the variations in diameter of the recesses and of the washers which must inevitably occur in quantity production and which, however small, affect the reliability with which the inserts may be locked in their recesses.

The general object of the present invention is to improve upon prior practice in this art by the provision of novel means for forming the loading inserts into nuts of the character described.

To this end the invention contemplates, instead of separately forming the nut bodies with insert receiving recesses therein and the washer-like inserts for subsequent loading into the recesses of the nut bodies, the formation first of a suitably recessed nut body which is thereafter used as a die for cutting its own individual insert from insert material in strip or sheet form, which insert is loaded into the nut concurrently by the same operation that separates the insert from the strip or sheet material.

For a better understanding of the more detailed nature and objects of the invention and the advantages accruing from its use, reference may best be had to the ensuing portion of this specification describing suitable mechanical means for carrying the invention into effect, as illustrated in the accompanying drawings forming a part hereof, in which:

Fig. 1 is a side elevation of a machine for forming and loading locking inserts into nut blanks in accordance with the invention;

Fig. 2 is a plan view of a part of the machine shown in Fig. 1;

Fig. 3 is a section taken on the line 3—3 of Fig. 1;

Fig. 4 is a section on enlarged scale taken on the line 4—4 of Fig. 2;

Fig. 5 is a view similar to Fig. 4 showing the parts of the machine in another position;

Fig. 6 is a perspective view of one of the machine elements;

Fig. 7 is a sectional view on still larger scale of a loaded nut blank as produced by the invention; and Fig. 8 is a view similar to Fig. 7 illustrating the final nut product.

Referring now more particularly to the drawings, the apparatus illustrated comprises a press having a press bed 10 which, as will be noted from Fig. 3, is inclined to the horizontal, and upwardly extending arms or supports 12 providing bearings 14 in which is journaled shaft 16 adapted to be driven by any suitable means such as the pulley 18. Supports 12 provide guides for a reciprocably mounted head 20 arranged to be reciprocated by means of a pitman or eccentric rod 22, one end of which is eccentrically mounted with respect to the axis of rotation of the shaft 16.

The reciprocable head 20 is provided with suitable tool retaining means for holding two punches 24 and 26, the purpose of which will be more fully explained later.

Feeding mechanism is provided for feeding insert material in strip form as indicated at 28 across the press bed. In the embodiment illustrated, this mechanism comprises feed rollers 30 and 32 mounted on a suitable bracket on the press and adapted to frictionally engage the strip 28. Advantageously, one of the rollers, as for example roller 32, is mounted in adjustable bearings 34 loaded by means of a spring 36, the tension of which may be adjusted by means of a suitable adjusting nut 38 to enable the desired amount of frictional engaging pressure to be applied by the feed rollers to the strip. The strip is advanced in step by step increments across the press bed by intermittent rotation of the feed roller 30. This is effected through the medium of a cam 39 fixed on shaft 16, which cam engages a roller 40 mounted on one of the arms of a bell crank 42 pivoted to a suitable bracket on one of the supports of the press. The other arm of the bell crank is connected by means of a link 44 passing through bracket 46 to the end of the crank arm 48, the other end of which is pivoted on the axis of feed roller 30. The arm 48 carries a pawl 50 arranged to engage a ratchet 52 fixed to the shaft on which roller 30 is mounted and a retracting spring 54 is provided for causing the roller 40 to follow the contour of cam 39. It will be evident that the above described mechanism will cause the strip 28 to be fed in step by step increments across the press bed, in timed relation to the movement of the reciprocating head 20 and its associated punches.

The press bed is provided with an inclined feed slot 56 for feeding nut blanks 58 having suitably formed insert receiving recesses therein, and hereinafter referred to as blanks, under punch 26. These blanks are fed into position under the punch and removed from such position in timed relation to the movement of the punch by mechanism including a transfer member which operates to remove a nut blank from beneath the punch 26 at suitably timed intervals and to permit another nut blank to move into position beneath the punch due to gravity.

The transfer member 60, shown in perspective in Fig. 6, is in the nature of a slide having guide flanges 62 reciprocably mounted in a dove-tail groove 63 formed in the press bed at right angles to the feed slot 56. As will be noted from Fig. 2, the slot 62 intersects and crosses slot 56. The press bed has formed therein a discharge slot 64 parallel to slot 56 but offset therefrom as shown in Fig. 2. The transfer member 60 is provided with a notch 66 just wide enough to freely receive a nut blank and is reciprocated in timed relation to the movement of the press head from a position in which the slot 66 registers with the bottom of the feed slot 56 to the position shown in Fig. 2 in which the notch 66 registers with the end of the discharge slot 64. The transfer member 60 is reciprocated by mechanism which in the embodiment illustrated comprises a cam 68, mounted on shaft 16, which is engaged by roller 70 on one arm of the bell crank 72 pivoted on one of the press supports 12. A second bell crank 74 is pivotally connected to the transfer member and the two bell cranks are connected by means of a link 76 to which is connected a retracting spring 78 for causing roller 70 to follow the contour of cam 68. It will be evident from Fig. 1 that the mechanism just described will operate to cause the transfer member to perform one complete cycle of reciprocation for each complete cycle of reciprocation of the press head 20 and in timed relation thereto.

The press bed is further provided with a recess 80 in which is secured as by means of suitable retaining studs 82 (Fig. 2) a die or anvil 84 (Figs. 4 and 5) having a bore 86 therein located in alignment with the punch 24. The studs 82 also advantageously serve to hold in position a retaining strip 88 spaced above the anvil 84 by sufficient distance to permit the strip 28 of insert material to pass between the die and the retaining element. The retaining element is provided with a bore in alignment with the punch 24.

The operation of the apparatus is as follows: Upon rotation of shaft 16 the feed roller 30 feeds the strip 28 in step by step increments through the slot provided above the die 84. At the same time the punch 24, working in timed relation to the stepwise feed, descends from the position shown in Fig. 4 to the position shown in Fig. 5 during the time interval when the strip 28 is stationary to punch therein a small hole or bore 92. As operation of the machine proceeds, a series of these bores are produced at definitely spaced intervals in the strip. The distance by which the strip is advanced by each step of the feed is related to the distance between the axis of the punches 24 and 26 so that at the termination of each step of feed, the strip is stopped with one of the bores 92 in centered alignment with the axis of punch 26. Since punches 24 and 26 reciprocate together, it will be evident that the timing of the feeding movement of the strip with respect to punch 26 will be the same as that with respect to punch 24 and that both punches will descend upon the strip with the latter stationary.

The transfer member 60 is so timed that during the descending movement of the punch 26 it is positioned with the nut receiving slot 66 in alignment with the feed slot 56 and also in alignment with the axis of punch 26. Thus, on the descending stroke of the punch 26 the slot in the transfer member serves to position a nut blank 58 under the punch and the perforated strip of insert material as shown in Fig. 4.

The nut blank illustrated is of known form and may be produced by any desired sequence of forming operations. The specific blank illustrated is that for a standard hexagonal self-locking nut of the kind under consideration and comprises a nut body 94 having a bore 96, the lower end of which is threaded and the upper end of which is counterbored to provide an open ended recess 98 for the reception of the locking insert.

As will be observed from Fig. 4, the nut body itself provides a die or anvil for cutting the insert which is to be received within the recess, and movement of the punch 26 from the position shown in Fig. 4 to the position shown in Fig. 5 serves to cut from the strip 28 an annular insert 100 which is forced by the punch to the bottom of the recess in the blank.

Upon return of the punches 24 and 26 to the upper position shown in Fig. 4, the feed mechanism operates to advance the strip so as to center the next bore 92 under punch 26 and simultaneously the transfer member is moved laterally to the position shown in Fig. 2, permitting the loaded nut to fall out through the discharge slot 64. Before punch 26 descends on its next succeeding stroke, the transfer member 60 is moved back to the position shown in Fig. 4 and as soon as the slot 66 comes into registry with the lower end of the feed slot 56, another nut blank slides by gravity into position under the punch.

The loaded nut blanks in the form shown in Fig. 7 are then advantageously finished by crimping the top edges of the walls of the recess so as to insure retention of the insert against axial displacement from the recess. This crimping operation may be carried out in different ways but is advantageously effected by means of apparatus of the kind disclosed in U. S. Patent No. 2,070,032, granted to me February 9, 1937.

The locking insert 100 is, as shown in Figs. 7 and 8, unthreaded and the bore 92 of the insert is somewhat smaller in diameter than the maximum diameter of the thread in the body of the nut but larger in diameter than the minimum diameter of the thread.

When the nut is threaded on a bolt, the bolt thread impresses a thread in the locking insert and in order for the nut to have the self-locking effect desired in accordance with the principles set out in the previously mentioned Rennerfelt patent, the insert must be of material having some elasticity. The material which up to the present time has been found to be most satisfactory for this purpose is laminated fibrous material of the kind known commercially as "vulcanized fiber."

It has been found that this material and other materials of like nature have the characteristic, when cut by the shearing action of a punch and cooperating die, of shearing along lines determined by the edge of the die or anvil rather than by the edge of the punch. This characteristic is important in securing one of the major advantages of the present invention. Because of this characteristic, the diameter of punch 26 may be made sufficiently small to enter the recess of the smallest diameter within the tolerance limits for a given size of nut, which means that the diameter of this punch may be appreciably less than the diameter of a recess which represents the maximum within the given tolerance limits. Regardless of this, however, the insert which is individually formed for each nut by the nut blank itself acting as a die, is forced with extremely tight fit into the recess because of the previously noted characteristic of the material of which the inserts are made to shear along the line of the die rather than the punch. In previously known methods of fabricating nuts of this character in accordance with which inserts and nut blanks are separately fabricated and the former loaded in finished form into the latter, variations are bound to occur in the outer diameters of the inserts and in the diameters of the recesses in the nut blanks. While these variations can be held to comparatively small values, they cannot be entirely eliminated in practical manufacture and these variations are bound to produce radial clearance between insert and nut body which is variable as between different assemblies of blank and insert. Such variation is, of course, undesirable and is entirely eliminated by the present invention which operates to insure the insertion into each blank, regardless of the diameter of its recess, of an insert which is fitted with extreme tightness of radial contact. This tight radial contact has been found by experience to be of major importance in insuring against turning of the insert in the nut and has further been found to be much more effective for this purpose than the axial pressure which can be exerted on the insert by crimping over the walls to produce the finished form of nut shown in Fig. 8. The degree of tightness of the insert in the nut which is obtained in practice with the present invention has been found to be such that the crimping over of the top of the walls of the recess is not essential to the production of a satisfactory nut since the tight radial contact is sufficient to prevent not only turning of the insert in the nut but also to be sufficient to prevent axial displacement of the insert from an open ended recess by the thrust produced by the bolt thread when the nut is threaded on a bolt. The crimping of the nut to the form shown in Fig. 8 is, however, to be preferred as a precautionary measure and also to produce a smoothly rounded finish on the upper face of the nut.

In addition to the materially improved product resulting from the present invention, the cost of manufacture of nut products of this character is substantially reduced by the invention as compared with prior known methods since it combines in one step the forming of the insert from the strip of sheet material and the loading of the insert so formed into the nut, thus reducing by one the number of operations required in the fabrication of the nut and the handling of large quantities of small inserts between the time they are produced and the time they are loaded.

What I claim is:

1. Apparatus for forming and loading locking inserts into nut blanks comprising means for feeding nut blanks having an open ended insert receiving recess therein to a forming station, means for feeding blank insert material over said nut blanks at said forming station, and means comprising a punch at said forming station for punching an insert from the blank material into said recess by an operation utilizing the nut blank as a die cooperating with the punch.

2. Apparatus for forming and loading locking inserts into nut blanks comprising means providing a first operating station and a second operating station, means for reciprocating a first punch at said first station, means for reciprocating a second punch at said second station, means for feeding blank insert material stepwise past said stations under said punches, said feeding means being adjusted to cause the holes punched in the blank material by said first punch to be centered under said second punch during the intervals between the stepwise feed, means for intermittently feeding nut blanks having open ended insert receiving recesses to said second station under said blank material and with the open end of the recess adjacent to the blank material, the first mentioned and the last mentioned feeding means being synchronized to position a nut blank under said second punch as each successive hole in the blank material is centered under said second punch and the means for reciprocating said second punch being synchronized to cause the punch to descend between the feeding movements to punch an insert from the blank material and load it in the recess by utilizing the nut blank as a die cooperating with the punch.

3. In a machine for forming and loading locking inserts into nut blanks having open ended nut receiving recesses therein, a punch, means for reciprocating said punch, means for intermittently feeding blank insert material under said punch, and means synchronized with the reciprocation of said punch for causing successive nut blanks to be fed under said punch and said blank material, to be utilized as dies cooperating with the punch for shearing individual locking inserts from the blank material.

4. In a machine for forming and loading locking inserts into nut blanks having open ended insert receiving recesses therein, a forming punch having substantially the diameter of the recesses in the nut blanks, means for reciprocating said punch, a transfer member, means for actuating said transfer member in timed relation to the means for reciprocating the punch for causing successive nut blanks to be positioned under said punch during its working stroke so as to permit the punch to enter the recess in the nut blank, and means operating in timed relation with the means for reciprocating the punch for intermittently feeding blank insert material between the punch and the successive nut blanks, whereby to cause said punch and the successive nut blanks cooperating therewith as dies to successively form locking inserts from said blank material and to load the inserts so formed into the recesses.

5. A press for automatically forming and loading locking inserts into nut blanks having insert receiving recesses therein comprising a press bed, a reciprocable press head, a first punch carried by said head, a second punch of larger diameter than the first punch carried by said head in laterally spaced relation, means for reciprocating said head whereby to reciprocate said punches in unison, a die carried by said press bed and positioned in alignment with said first punch, means for feeding blank insert material intermittently under both of said punches whereby to cause a series of holes to be punched in the material by said first punch and its cooperating die, said feeding means being adjusted and operated in time relation to the means for reciprocating the punches so as to center successive holes formed in said material by said first punch under said second punch during the working stroke of the second punch, a transfer member for causing successive nut blanks to be positioned under said material with the recesses therein immediately adjacent to the material and in alignment with said second punch, whereby to cause the nut blanks to cooperate as dies with said second punch to form and load locking inserts into said recesses, and means for actuating said transfer member in timed relation with the punch reciprocating means to position a different nut under said second punch for each working stroke of the punch.

6. Apparatus for forming and loading locking inserts in nut blanks having open ended insert receiving recesses comprising a reciprocating punch, feeding means comprising a transfer member for causing a different nut blank to be positioned under said punch during each working stroke thereof so as to permit the punch to enter the recess at the end of its working stroke, and means for intermittently feeding blank insert material between said punch and the nut blank positioned thereunder, whereby to cause the nut blank to act as a die cooperating with the punch to shear an insert from the blank material and load it in the recess.

CARL A. SWANSTROM.